C. F. EWING.
BOX CAR CONSTRUCTION.
APPLICATION FILED MAR. 15, 1917.
1,227,408.
Patented May 22, 1917.
2 SHEETS—SHEET 1.
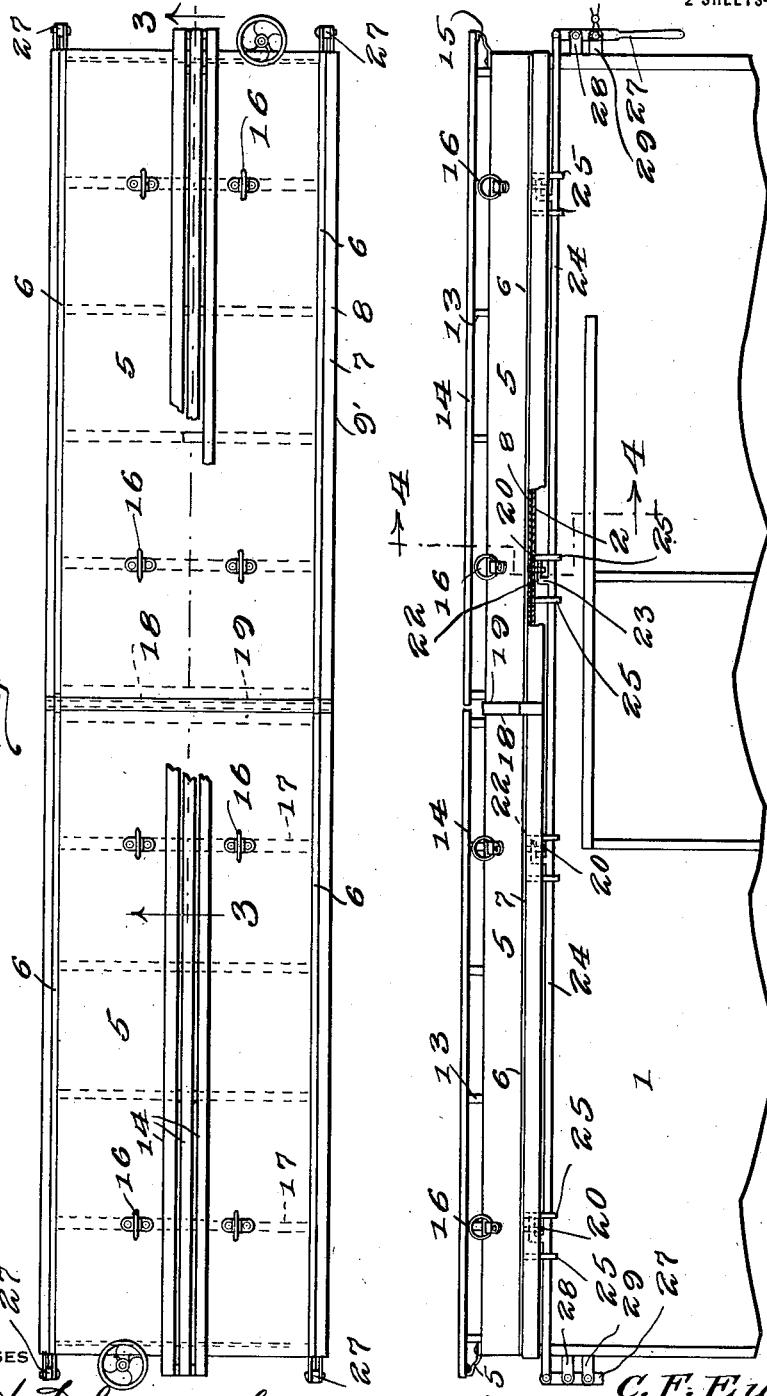

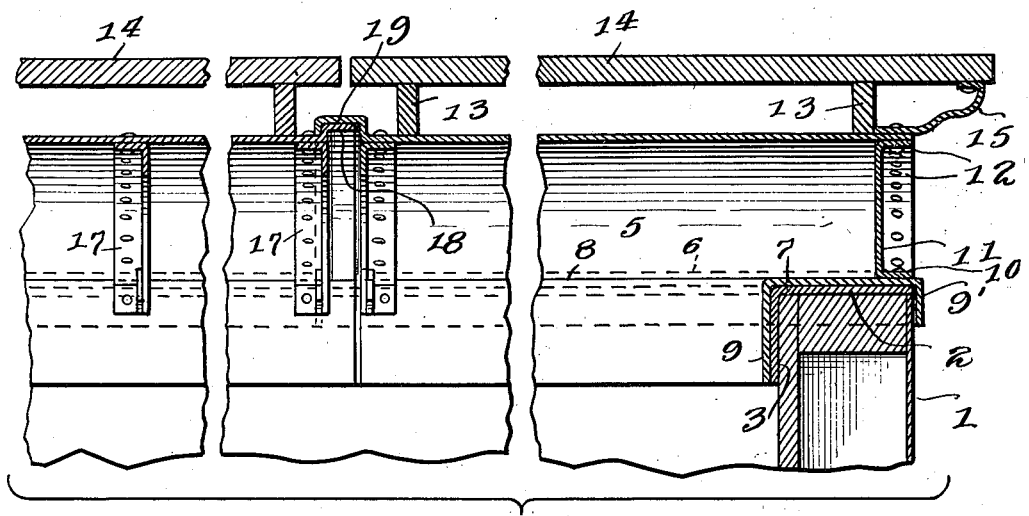

UNITED STATES PATENT OFFICE.

CHARLES F. EWING, OF JOHNSTOWN, PENNSYLVANIA.

BOX-CAR CONSTRUCTION.

1,227,408.  Specification of Letters Patent.  Patented May 22, 1917.

Application filed March 15, 1917. Serial No. 155,120.

*To all whom it may concern:*

Be it known that I, CHARLES F. EWING, a citizen of the United States, residing at Johnstown, in the county of Cambria and State of Pennsylvania, have invented new and useful Improvements in Box-Car Constructions, of which the following is a specification.

The present invention relates to improvements in box car construction and has for its primary object to provide a removable top or roof for this class of cars.

In carrying out my invention it is my purpose to provide a box car with a roof or top of a novel construction, that may, if desired, be formed in mating sections whereby the roof or any of the sections comprising the roof may be readily removed, by a suitable crane or similar device, so that access can be obtained to a portion of the interior or to the entire interior of the car for loading the car or in removing the load from the car, and consequently greatly facilitate in the loading or the unloading of the car as well as to permit of the entire area of the car being filled, which is not possible with the ordinary construction of such cars.

It is a still further object of the invention to so construct the removable top of a box car as to facilitate the arrangement of the same on the car or the removal thereof from the car, and to further provide means whereby to effectively secure the roof in locked position upon the car.

It is a still further object of the invention to produce a removable roof for box cars which may be constructed in sections and which sections, when associated, will have their joints interengaging to prevent the entrance of moisture to the car from between the roof sections, while the roof proper also engages with the car in a manner that will likewise prevent the entrance of the elements between the said roof and the car.

It is a still further object of the invention to produce a new construction for box cars which shall be of a comparatively simple nature, also comparatively cheap to manufacture, and one that will be strong and thoroughly efficient for the purpose intended.

With the above and other objects in view the improvement resides in the construction, combination and arrangement of parts set forth in the following specification and falling within the scope of the appended claims.

In the drawings:

Figure 1 is a side elevation of the upper portion of a box car provided with my improvement, parts being broken away and parts being shown in section, Fig. 2 is a plan view of the same, also showing parts broken away and parts in section, Fig. 3 is a greatly enlarged sectional view approximately on the line 3—3 of Fig. 2, Fig. 4 is a transverse sectional view approximately on the line 4—4 of Fig. 1, Fig. 5 is a detail side elevation, parts being broken away and parts being shown in section, Fig. 6 is an end elevation of the upper portion of the car, the roof being illustrated in a raised position.

The body of the car 1 is of the ordinary construction, but, upon the upper or purlin plates I secure, in any desired or preferred manner, a reinforcement in the nature of a metal plate or plates 2, the same, upon their inner ends being formed with an angular flange 3 that engages with the inner face of the sides and ends of the car. The plate 2, upon the longitudinal portions or sides of the car project a suitable distance beyond the said sides, but the plates 2, at the ends of the car terminate flush with the outer surfaces of the said ends. The longitudinal plates 2, at desired spaced intervals, have their projecting portions provided with openings 4, the purpose of which arrangement will hereinafter be apparent.

The top or roof of the car is broadly indicated by the numeral 5, and in the showing of the drawings comprises two sections. The roof 5 is preferably constructed of metal, each of the sections comprising the same being in the nature of an arched plate, the edges of the said plates, indicated for distinction by the characters 6, being straight whereby the same are arranged over and are secured to the horizontal members 7 of flanged plates 8. The inner flanges 9 of the plates 8 are arranged to contact with the outer faces of the flanges 3 of the plates 2, and the outer flanges 9' of said plates 8 engage with the outer edges of the plates 2, and by this arrangement it will be noted that the plates 8 upon the longitudinal portions of the roof are of a greater width than that of the transverse or end plates, the latter having their outer flanges 9' snugly engaging the ends of the car, and also, as stated, contacting with the edges of the plates 2 on the ends of the car. The last referred to end plates 8 are secured to the lower flanges 10 of the arch-shaped end plates 11 for the roof, the upper flanges 12 of the said plates being secured to the roof. By this arrangement it will be noted that the roof does not project to any determined extent beyond the ends of the car, so that the same may be positioned upon the car or removed therefrom without interfering with the brake shafts or with the brake wheels secured to the said shafts.

The roof 5 is centrally provided upon its outer surface with spaced transverse cleats 13 which support the running board 14, the said running board preferably extending a suitable distance beyond the ends of the roof, and the said extending ends are supported by metallic stirrup members 15 that are secured to the underface of the running board and to the end plates 11 of the roof. The roof, at desired intervals, to the opposite sides of the running board, has swiveled thereon spaced ring members 16, the said rings being provided to receive the hooks of cables carried by suitable cranes or derricks whereby the roof may be removed from or positioned upon the car.

The arched roof, upon the underface thereof, is reinforced by transversely arranged angle cleats or ribs 17 which are, of course, arched to conform to the shape of the roof, and the inner end of one of the roof sections, which extends beyond the outer rib, is formed with an offset portion or flange 18 arranged throughout the transverse length of the said section, and this offset portion or flange is adapted to be received in a substantially U-shaped pocket 19 formed at the inner end of the other roof section, and by this arrangement it will be noted that the roof sections may be effectively connected to insure an element proof joint between the sections.

The plates 8 upon the side of the roof are provided inward of the flanges 9' with spaced depending lugs 20, one of which being arranged to pass through each of the openings 4 in the plate 2. Each of the lugs 20 is provided with a slot or opening 21 through which is adapted to pass a bolt member 22 provided upon angular elements 23 that are secured or integrally formed with slidable bars 24 which are mounted for movement in suitable guide yokes 25 that are preferably suspended from the projecting ends of the plates 2 upon the sides of the car. The bolt members 22 have their ends provided with transverse openings 26, through which may be passed staples of lock members or the wire of seal members to retain the bolts in engagement with the keeper lugs 20. Upon the opposite ends of the slidable rods 24 are pivotally secured levers 27, the said levers being pivotally supported upon brackets 28 projecting from the ends of the car and are, of course, secured to the said ends. The levers 27 are adapted to be received in the bifurcated ends of what I will term keeper members and which are designed by the numerals 29, the arms provided by the bifurcations in the said members being formed with openings 30 that are adapted to receive the shackle of a lock or the wire of a seal, whereby to retain the levers in the keepers, when the said levers have been swung to slide the bar 24 to bring the lock bolts 22 through the openings in the studs 20, to secure the roof upon the car.

From the above description, taken in connection with the accompanying drawing, the simplicity of the device, as well as the advantages thereof will, it is thought, be perfectly apparent to those skilled in the art to which such invention appertains without further detailed description.

Having thus described the invention, what I claim is:

1. In combination, a box car having an open top, plates upon the upper edges of the car projecting over the sides of the car and provided with openings, a removable roof for the car including channeled plates having their inner flanges contacting with the inner sides of the car and their outer flanges contacting with the outer edges of the referred to plates, slotted studs upon the channeled members passing through the referred to openings in the mentioned plates, and locking means upon the sides of the car including bolt members designed to pass through the slots in the studs.

2. In combination, a box car having an open top, angle plates secured to the top and the side plates extending over the sides of the car and provided with openings, an arch-shaped metallic roof for the car, channeled members secured to the edge of the roof and designed to receive the angle plates, depending slotted studs on the channeled members passing through the openings in the angle plates, slidable rods on the sides of the car, bolt members upon the slidable members, actuating levers for the slidable members whereby to move the latter to bring the bolts through the openings in the studs, and locking means for the sliding members.

3. In combination, a box car having an open top, angle plates secured to the upper edge of the top, and projecting beyond the sides of the car, and said plates having spaced openings, an arch-shaped metallic roof constructed in sections, flanged arch-shaped end plates for the roof, channeled plates secured to the edges of the roof and adapted to receive the angle plates of the car, angle ribs arranged transversely of the roof, one of the roof sections having its end provided with a continuous offset portion, the confronting end of the other roof section having a continuous pocket to receive the said offset end of the first mentioned section, swiveled rings on the roof sections, slotted studs depending from the channeled members and passing through the openings in the angle plates of the car, slidable bars upon the sides of the car, offset members comprising bolts upon the bars, levers pivotally secured to the ends of the car and pivotally connected to the ends of the bar and adapted, when actuated to bring the bolts through the slots in the stud, keepers for the levers, and locking means for the keepers.

In testimony whereof I affix my signature.

CHARLES F. EWING.